(12) United States Patent
Aarskog

(10) Patent No.: US 11,489,189 B2
(45) Date of Patent: Nov. 1, 2022

(54) SUBSEA UNINTERRUPTIBLE POWER SUPPLY

(71) Applicant: SIEMENS ENERGY AS, Oslo (NO)

(72) Inventor: Fredrik Gundersen Aarskog, Raelingen (NO)

(73) Assignee: SIEMENS ENERGY AS, Oslo (NO)

( * ) Notice: Subject to any disclaimer, the term of this patent is extended or adjusted under 35 U.S.C. 154(b) by 606 days.

(21) Appl. No.: 16/303,168

(22) PCT Filed: Apr. 21, 2017

(86) PCT No.: PCT/EP2017/059518
§ 371 (c)(1),
(2) Date: Nov. 20, 2018

(87) PCT Pub. No.: WO2017/202553
PCT Pub. Date: Nov. 30, 2017

(65) Prior Publication Data
US 2020/0328446 A1   Oct. 15, 2020

(30) Foreign Application Priority Data

May 24, 2016 (EP) ..................................... 16170949

(51) Int. Cl.
*H01M 8/18* (2006.01)
(52) U.S. Cl.
CPC ................... *H01M 8/188* (2013.01)
(58) Field of Classification Search
CPC ........ H01M 8/18–188; H01M 6/30–34; Y02E 60/50
See application file for complete search history.

(56) References Cited

U.S. PATENT DOCUMENTS

| 4,092,484 A | * | 5/1978 | Majkrzak | ................ | H01F 27/14 174/12 R |
| 5,162,165 A | * | 11/1992 | Bianchi | .................. | B60L 58/26 429/422 |

(Continued)

FOREIGN PATENT DOCUMENTS

EP     2610881 A1     7/2013

OTHER PUBLICATIONS

Flow battery, https://en.wikipedia.org/wiki/Flow_battery.

(Continued)

*Primary Examiner* — Cynthia H Kelly
*Assistant Examiner* — Niara Trant
(74) *Attorney, Agent, or Firm* — Wolter Van Dyke Davis, PLLC

(57) ABSTRACT

An uninterruptible power supply unit for subsea applications includes a flow battery including: at least one flow battery module including at least a negative electrode cell and a positive electrode cell, a first electrolyte storage tank connected to the negative electrode cell to provide the negative electrode cell with a first electrolyte, and a second electrolyte storage tank connected to the positive electrode cell to provide the positive electrode cell with a second electrolyte. The unit further includes at least one electrolyte pressure compensator, connected to the first electrolyte storage tank and connected to the second electrolyte storage tank, respectively, to provide pressure balancing between an ambient medium surrounding the at least one electrolyte pressure compensator and first electrolytes and second electrolytes inside the first electrolyte storage tank and inside the second electrolyte storage tank, respectively.

24 Claims, 2 Drawing Sheets

(56) References Cited

U.S. PATENT DOCUMENTS

| | | | |
|---|---|---|---|
| 5,876,872 A * | 3/1999 | Feezor | H01M 10/42 |
| | | | 429/118 |
| 9,038,433 B2 | 5/2015 | Skjetne et al. | |
| 2003/0022059 A1 | 1/2003 | Ito et al. | |
| 2012/0291688 A1 | 11/2012 | Dawes | |
| 2013/0175041 A1 | 7/2013 | Nellessen, Jr. | |
| 2016/0006052 A1 | 1/2016 | Li et al. | |

OTHER PUBLICATIONS

History of Vanadium Redox Battery, http://www.vrb.unsw.edu.au/about-us/history-of-vanadium-redox-battery.html.
Proton exchange membrane, Wikipedia, https://en.wikipedia.org/wiki/Proton_exchange_membrane.
Energy Storage Sense, http://energystoragesense.com/flow-batteries/.
Nafion, Wikipedia, https://en.wikipedia.org/wiki/Nafion.
Vanadium redox battery, Wikipedia, https://en.wikipedia.org/wiki/Vanadium_redox_battery.
PCT International Search Report and Written Opinion of International Searching Authority dated Jul. 7, 2017 corresponding PCT International Application No. PCT/EP2017/059518 filed Apr. 21, 2017.
European Search Report for EP 16170949 dated Nov. 24, 2018.

\* cited by examiner

SUBSEA UNINTERRUPTIBLE POWER SUPPLY

PRIORITY STATEMENT

This application is the national phase under 35 U.S.C. § 371 of PCT International Application No. PCT/EP2017/059518 which has an International filing date of Apr. 21, 2017, which designated the United States of America and which claims priority to European Patent Application No. EP16170949.8 filed May 24, 2016, the entire contents of which are hereby incorporated herein by reference.

FIELD

An embodiment of the present invention generally relates to an uninterruptible power supply (UPS) unit for subsea applications.

BACKGROUND

In subsea applications, subsea power grids have been developed for supplying power to devices that are located on the seabed, e.g. a compressor used to compress gas from an offshore gas field through a pipeline to an onshore destination. A subsea power grid may include, for example, a subsea transformer or a subsea switchgear or a subsea variable speed drive (VSD). Typical water depth for such subsea applications can be 3000 m (corresponding to a pressure of 300 bar) or more.

In subsea applications of the above mentioned type, also uninterruptible power supply (UPS) may be used. In particular, if the subsea power grid is to be used to supply critical loads that require a backup power (i.e. until safe shutdown of the process is obtained) a subsea UPS system is required. Critical loads can be control systems or subsea VSDs driving a critical rotating device, e.g. a compressor.

In present subsea applications, it is also known to locate batteries or UPSs inside pressure resistant chambers, assuring that a pressure of 1 atm is maintained inside the enclosure where the components are located.

The main inconvenience of such technical solution is that a pressure chamber designed for any considerable volume, as it is required to containing the UPS components, must have extremely thick walls to withstand the pressure. This leads, as further inconveniences, to an excessively high weight, high cost of materials and difficult cooling conditions.

SUMMARY

At least one embodiment of the present invention provides an uninterruptible power supply (UPS) unit for subsea applications, which improves upon or overcomes at least one of the inconveniences above described.

An uninterruptible power supply (UPS) unit according to the embodiments is provided. The claims describe advantageous developments and modifications of the invention.

According to a first embodiment of the present invention, an uninterruptible power supply unit for subsea applications comprises a flow battery including:
  at least a flow battery module having at least a negative electrode cell and at least a positive electrode cell,
  a first electrolyte storage tank connected to the negative electrode cell to provide the negative electrode cell with a first electrolyte,
  a second electrolyte storage tank connected to the positive electrode cell to provide the positive electrode cell with a second electrolyte.

DETAILED DESCRIPTION OF THE EXAMPLE EMBODIMENTS

Figure 1:
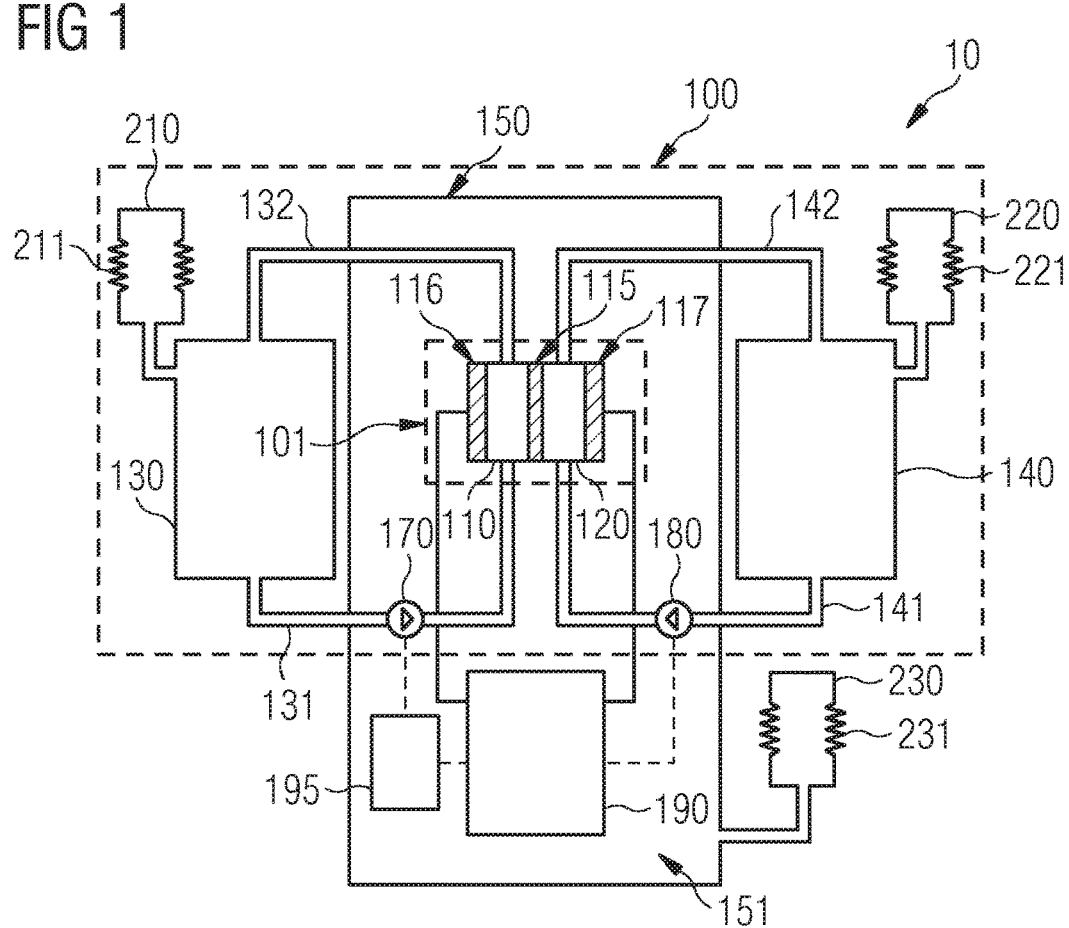
FIG. 1 shows a schematic view of an uninterruptible power supply unit for subsea application, according to an embodiment of the present invention.

According to a first embodiment of the present invention, an uninterruptible power supply unit for subsea applications comprises a flow battery including:
  at least a flow battery module having at least a negative electrode cell and at least a positive electrode cell,
  a first electrolyte storage tank connected to the negative electrode cell to provide the negative electrode cell with a first electrolyte,
  a second electrolyte storage tank connected to the positive electrode cell to provide the positive electrode cell with a second electrolyte.

The uninterruptible power supply unit of at least one embodiment comprises at least one electrolyte pressure compensator connected to the first electrolyte storage tank and to the second electrolyte storage tank for providing pressure balancing between an ambient medium surrounding the at least one electrolyte pressure compensator and the first and second electrolytes inside the first and second electrolyte storage tanks.

According to an embodiment of the present invention, the use of at least one electrolyte pressure compensator avoids the use of thick pressure chambers designed for containing the UPS components and at the same time maintaining an inside pressure of 1 atm, while the pressure of the ambient medium (sea water) surrounding the UPS unit may be typically around 300 bar.

In the subsea UPS of an embodiment of the present invention, a flow battery (also called "redox flow battery" or "redox flow cell") is used and pressure compensated by adding a pressure compensator to the electrolyte tanks.

The use of a flow battery in the UPS permits to:
  leave the battery completely discharged for long periods (months/years) with no ill effects,
  fully cycle (charge/discharge) the battery many times since there are no phase transitions involving the solids of the electrodes, in particular no or little wear and tear of the electrodes occur,
  achieve no or low self-discharge since there is no chemical action outside the cells of the electrode cells,
  achieve no emission of gasses during charging or discharging of the battery.

The above designs including the pressure compensator provides at least one of the following further advantages:
  reduced weight of the unit, the energy capacity of the flow battery can easily be changed by changing the volume of the electrolyte storage tanks, up to several MWh.

According to possible example embodiments of the present invention, the uninterruptible power supply unit comprises:
a first electrolyte pressure compensator connected to the first electrolyte storage tank for providing pressure balancing between an ambient medium surrounding the first electrolyte pressure compensator and the first electrolyte inside the first electrolyte storage tank,
a second electrolyte pressure compensator connected to the second electrolyte storage tank for providing pressure balancing between an ambient medium surrounding the second electrolyte pressure compensator and the second electrolyte inside the second electrolyte storage tank.

According to other possible example embodiments of the present invention, the uninterruptible power supply unit further comprises:
a main enclosure filled with a dielectric fluid, the flow battery being housed in the main enclosure immersed in the dielectric fluid,
a dielectric fluid pressure compensator for providing pressure balancing between an ambient medium surrounding the main enclosure and the dielectric fluid inside the main enclosure.

The pressure compensation of the main enclosure allows for passive cooling. The convective flow of the dielectric fluid in the main enclosure transports heat from the flow battery cells and from the other components, which are eventually present inside the main enclosure, to the enclosure walls and finally to the ambient medium (sea water).

According to other possible example embodiments of the present invention, the main enclosure further houses:
at least one of the first electrolyte storage tank and of the second electrolyte storage tank,
at least one electrolyte storage tank providing pressure balancing between the dielectric fluid inside the main enclosure and electrolyte inside the electrolyte storage tank which is housed in the main enclosure.

Having one or both of the tanks inside the main enclosure provides an overall compact design of the UPS.

According to respective embodiments of the present inventions, the uninterruptible power supply unit further comprises one or more of the following components:
one or two electrolyte pumps for pumping one or both of the first and second electrolytes from the respective first or second electrolyte storage tank to the respective negative or positive electrode cell,
one or more electrolyte valves interposed between the first or second electrolyte storage tank and the respective negative or positive electrode cell, respectively,
an electrical power converter electrically connected to the flow battery modules and electrically connectable to an external load to be powered by the uninterruptible power supply unit,
one or more electrical switches provided between the flow battery modules and the electrical power converter,
a control system module for controlling the electrolyte pumps and the electrical power converter.

According to the possible different embodiments of the present invention, the above components may be provided inside or outside the main enclosure.

Electrical switches electrical connected to the anode and cathode of each flow battery module permits to electrically disconnect each flow battery module from the power converter, e.g. during or after an electrical fault, thus providing advantageous redundancy to the unit.

The use of electrolyte valves interposed between the first or second electrolyte storage tank and the respective negative or positive electrode cell, respectively, give the advantageous possibility to disconnect each flow battery module from the electrolyte tanks, in particular in case of leakages.

According to possible embodiments of the present invention, the flow battery module has a plurality of negative electrode cell and a plurality of positive electrode cell arranged in series. Advantageously, this allows providing a higher output voltage, which makes the fuel cell and converting process more efficient.

According to other possible embodiments of the present invention, the flow battery includes a plurality of flow battery modules, each modules being connected to the first electrolyte storage tank and to the second electrolyte storage tank.

Advantageously, this allows the power capacity can be increased by adding more fuel cell modules in parallel, up to several MW, because the power a flow battery can supply is a function of the surface area of the electrodes and membranes.

This also means that the power capacity is decoupled from the energy storage. In a flow battery the energy is stored chemically in the electrolytes, and therefore it can be changed by changing the volume of the electrolyte storage tanks.

According to a possible embodiment of the present invention, the first and/or the second electrolyte is Vanadium.

The Vanadium redox battery has a very fast response to changing loads (i.e. 100% change in 0.5 ms) and very large overload capabilities (i.e. 400% for 10 sec). As an alternative Zinc Bromine flow batteries or Polysulphide flow batteries may be used. As a further alternative, flow batteries having organic solutions as electrolytes may be used. Organic electrolytes are expected to be less toxic, have higher energy storage capabilities per volume, and lower cost of the electrolyte.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

The illustrations in the drawings are schematic. It is noted that in different figures, similar or identical elements are provided with the same reference signs.

FIG. 1 shows a possible embodiment of an uninterruptible power supply (UPS) unit 10 for subsea applications, according to the present invention.

The UPS unit 10 comprises a main enclosure 150 filled with a dielectric fluid 151, e.g. Midel 7131 or another similar dielectric fluid. A dielectric fluid pressure compensator 230 is connected to the main enclosure 150 for providing pressure balancing between an ambient medium (e.g. sea water) surrounding the main enclosure 150 and the dielectric fluid inside the main enclosure 150. The pressure compensator 230 is of one of the types already known in the art, for example including a metallic bellow 231, and therefore not described in further detail.

The UPS unit 10 includes a flow battery 100 housed in the main enclosure 150, immersed in the dielectric fluid 151.

Flow batteries (also called "redox flow batteries" or "redox flow cell") are a subclass of regenerative fuel cells.

The rechargeability is provided by two electrolytes contained within the system and separated by a membrane.

The flow battery 100 includes, in the embodiment of FIG. 1, a flow battery module 101 having a negative electrode cell 110 and a positive electrode cell 120, separated by an ion selective membrane 115 (also called "proton exchange membrane"). The ion selective membrane 115 may be made of a fluoropolymer, such as Nafion.

The a flow battery module 101 includes a negative electrode (anode) 116 and a positive electrode (cathode) 117 at opposite ends of the flow battery module 101, in such a way that the negative electrode cell 110 is comprised between the anode 116 and the membrane 115 and that the positive electrode cell 120 is comprised between the membrane 115 and the cathode 117.

The flow battery module 101 may be of different types, depending from the electrolytes which are used inside the electrode cells 110, 120. Possible choices are:
Vanadium-based,
Zinc Bromine,
Polysulphide Bromine,
organic electrolytes, where metal ions are replaced with organic charge carriers such as quinones,
other electrolytes.

The flow battery 100 includes a first electrolyte storage tank 130 connected to the negative electrode cell 110 to provide the negative electrode cell 110 with a first electrolyte. A first supply manifold 131 is provided to connect the first electrolyte storage tank 130 to a first end of the negative electrode cell 110. The first supply manifold 131 delivers a flow of fresh first electrolyte from the first electrolyte storage tank 130 to the negative electrode cell 110. A first discharge manifold 132 is provided to connect a second end of the negative electrode cell 110 to the first electrolyte storage tank 130. The first discharge manifold 132 collects a flow of spent first electrolyte from the negative electrode cell 110 and delivers it back to the first electrolyte storage tank 130. A first electrolyte pump 170 for pumping the first electrolyte from the first electrolyte storage tank 130 to the negative electrode cell 110 is provided along the first supply manifold 131. According to another embodiment of the present invention (not shown) the first electrolyte pump 170 and the first electrolyte is fed to the negative electrode cell 110 by gravity.

The flow battery 100 includes a second electrolyte storage tank 140 connected to the positive electrode cell 120 to provide the positive electrode cell 120 with a second electrolyte. A second supply manifold 141 is provided to connect the second electrolyte storage tank 140 to a first end of the positive electrode cell 120. The second supply manifold 141 delivers a flow of fresh first electrolyte from the second electrolyte storage tank 140 to the positive electrode cell 120. A second discharge manifold 142 is provided to connect a second end of the positive electrode cell 120 to the second electrolyte storage tank 140. The second discharge manifold 142 collects a flow of spent second electrolyte from the positive electrode cell 120 and delivers it back to the second electrolyte storage tank 140. A second electrolyte pump 180 for pumping the second electrolyte from the second electrolyte storage tank 130 to the positive electrode cell 120 is provided along the second supply manifold 141. According to another embodiment of the present invention (not shown) the second electrolyte pump 180 and the second electrolyte is fed to the positive electrode cell 120 by gravity.

The flow battery 100 further comprises:
a first electrolyte pressure compensator 210 connected to the first electrolyte storage tank 130 for providing pressure balancing between the ambient medium (sea water) surrounding the first electrolyte pressure compensator 210 and the first electrolyte inside the first electrolyte storage tank 130,
a second electrolyte pressure compensator 220 connected to the second electrolyte storage tank 140 for providing pressure balancing between the ambient medium (sea water) surrounding the second electrolyte pressure compensator 220 and the second electrolyte inside the second electrolyte storage tank 130.

Both the pressure compensators 210, 220 are of one of the types already known in the art, for example including respective metallic bellows 211, 221, and therefore not described in further detail.

According to another embodiment of the present invention (not shown) the UPS unit 10 comprises only one electrolyte pressure compensator connected to both the first and second electrolyte storage tanks 130, 140 for providing pressure balancing between the ambient medium (sea water) and the first and second electrolytes inside the first and second electrolyte storage tanks 130, 140. For example, one electrolyte pressure compensator may be provided, which comprises two different chambers, one for compensating the pressure in the first electrolyte pressure compensator 210 and the other for compensating the pressure in the second electrolyte pressure compensator 220.

In the embodiment of FIG. 1, the first and second electrolyte storage tanks 130, 140 and the first and second pressure compensator 210, 220 are outside the main enclosure 150.

According to another embodiment of the present invention (not shown) the first electrolyte storage tanks 130 and the first pressure compensator 210 are housed inside the main enclosure 150.

According to another embodiment of the present invention (not shown) the second electrolyte storage tanks 140 and the second pressure compensator 220 are housed inside the main enclosure 150.

According to yet another embodiment of the present invention (not shown) the first and second electrolyte storage tanks 130, 140 and the first and second pressure compensator 210, 220 are all housed inside the main enclosure 150.

The UPS unit 10 of FIG. 1 comprises, inside the main enclosure 150, an electrical power converter 190 electrically connected to the anode 116 and cathode 117 of the flow battery module 101 and electrically connectable to an external load (for example a subsea VSD) which has to be powered by the UPS unit 10. The electrical power converter 190 may be an AC/DC converter or another type of converter transforming the output of the flow battery module 101 into a convenient input for the external load.

The UPS unit 10 of FIG. 1 comprises, inside the main enclosure 150, a control system module 195 for controlling the flow rate generated by the electrolyte pumps 170, 180 (for example by controlling the speed of the electrolyte pumps 170, 180) and controlling the output of the electrical power converter 190.

Figure 2:
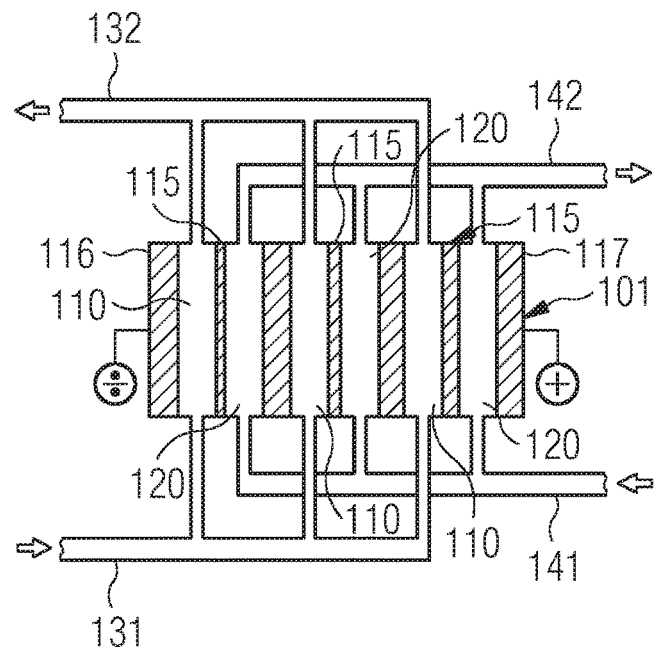
FIG. 2 shows a schematic partial view of a first alternative embodiment of an uninterruptible power supply unit for subsea application, according to the present invention.

FIG. 2 shows a different possible embodiment of the flow battery module for the UPS unit 10, according to the present invention. According to such embodiment, the flow battery module 101 has a plurality of negative electrode cells 110 (three negative electrode cells 110) and a plurality of positive electrode cell 120 (three positive electrode cells 120) arranged in series. Each couple of adjacent negative and positive electrode cells 110, 120 having the negative electrode cell 110 facing the anode 116 and the positive electrode cell 120 facing the cathode 117 constitutes a single elementary cell of flow battery module 101. In each elementary cell 110, 120 the electrodes are separated by a respective ion selective membrane 115 (three selective membranes 115 are present). Each elementary cell 110, 120 is separated from another elementary cell 110, 120 by means of a bipolar electrode 118 (two bipolar electrodes 118) including an anode and a cathode).

This embodiment allows multiplying the output voltage of the flow battery module 101, with respect to the output voltage (1-3 Vdc) of embodiment of FIG. 1, with one negative electrode cell 110 and one negative electrode cell 110. In FIG. 2, each negative electrode cell 110 is connected to the same first supply manifold 131 and the same first discharge manifold 132. Each positive electrode cell 120 is connected to the same second supply manifold 141 and the same second discharge manifold 142.

Figure 3:
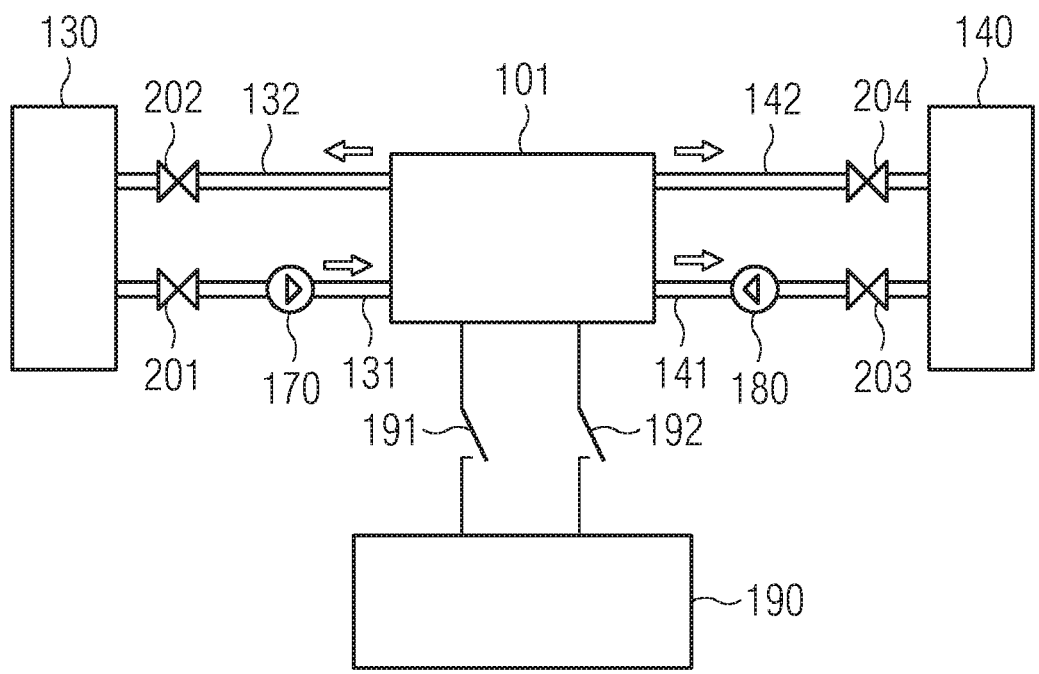
FIG. 3 shows a schematic partial view of a second alternative embodiment of an uninterruptible power supply unit for subsea application, according to the present invention.

FIG. 3 shows another different possible embodiment of the flow battery module for the UPS unit 10, according to the present invention. According to such embodiment, the UPS unit 10 further comprises an electrolyte valve 201, 202, 203, 204 on each of the first supply manifold 131, the first discharge manifold 132, the second supply manifold 141 and the second discharge manifold 142, respectively.

The first electrolyte valve 201 is interposed between the first electrolyte storage tank 130 and the first electrolyte pump 170. The second electrolyte valve 202 controls the flow of the first electrolyte from the flow battery module 101 to the first electrolyte storage tank 130.

The third electrolyte valve 203 is interposed between the second electrolyte storage tank 140 and the second electrolyte pump 180. The fourth electrolyte valve 204 controls the flow of the second electrolyte from the flow battery module 101 to the second electrolyte storage tank 140.

The electrolyte valves 201, 202, 203, 204 permits to hydraulically isolate the flow battery module 101 from the electrolyte storage tanks 130 140, in particular in case a leakage in the flow battery module 101 occurs.

A plurality of electrical switches (two electrical switches 191, 192 in the embodiment of FIG. 3) is provided between the flow battery module 101 and the electrical power converter 190. The electrical switches 191, 192 permit to electrically isolate the flow battery module 101 from the electrical power converter 190, in particular in case an electrical failure occurs in the flow battery module 101 or in the electrical power converter 190.

In the embodiments of FIGS. 1 to 3, the first and the second electrolyte pumps 170, 180, the electrolyte valves 201, 202, 203, 204, electrical power converter 190, the control system module 195 and the electrical switches 191, 192 are all housed inside the main enclosure 150.

According to other embodiments of the present invention (not shown) any of the first and the second electrolyte pumps 170, 180, the electrolyte valves 201, 202, 203, 204, electrical power converter 190, the control system module 195 and the electrical switches 191, 192 may be housed outside the main enclosure 150.

Figure 4:
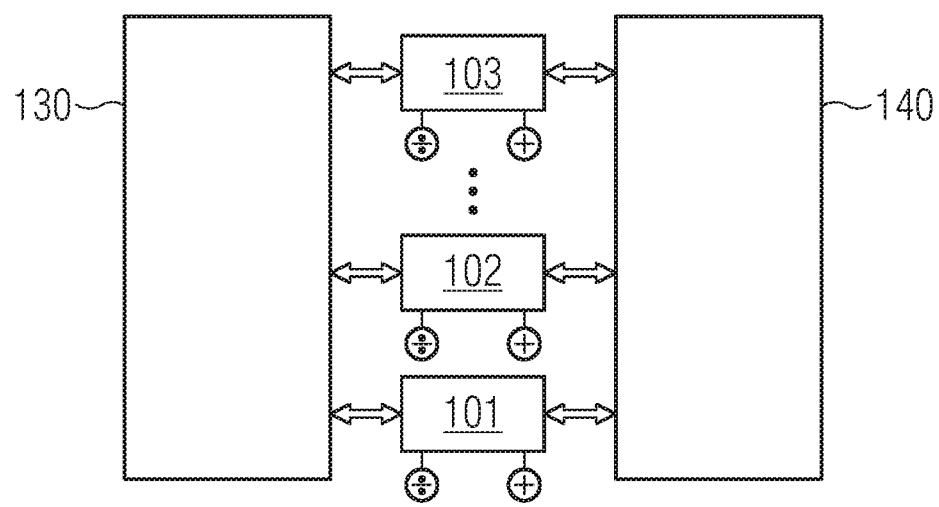
FIG. 4 shows a schematic partial view of a third alternative embodiment of an uninterruptible power supply unit for subsea application, according to the present invention.

FIG. 4 shows another different possible embodiment of the flow battery module for the UPS unit 10, according to the present invention. According to such embodiment, the UPS unit comprises a plurality of flow battery modules (in particular, three flow battery modules 101, 102, 103). Each module 101, 102, 103 is hydraulically connected to the common first electrolyte storage tank 130 and to the common second electrolyte storage tank 140 and electrically connected to the common electrical power converter 190 (not shown in FIG. 4).

The flow battery modules 101, 102, 103 are, in possible embodiments of the present invention, standardized components containing a number of single elementary cell connected in series (as described with reference to FIG. 2). Electrolyte pumps 170, 180, electrolyte valves 201, 202, 203, 204, and electrical switches 191, 192 may be provided for each flow battery modules 101, 102, 103.

The invention claimed is:

1. An uninterruptible power supply unit for subsea applications comprising:
   a flow battery including:
   at least one flow battery module including at least a negative electrode cell and a positive electrode cell,
   a first electrolyte storage tank connected to the negative electrode cell to provide the negative electrode cell with a first electrolyte,
   a second electrolyte storage tank connected to the positive electrode cell to provide the positive electrode cell with a second electrolyte;
   at least one electrolyte pressure compensator, connected to the first electrolyte storage tank and connected to the second electrolyte storage tank, respectively, and configured to provide pressure balancing between an ambient medium surrounding the at least one electrolyte pressure compensator at a pressure of about 300 bar and first electrolytes and second electrolytes inside the first electrolyte storage tank and inside the second electrolyte storage tank, respectively; and
   a main enclosure, filled with a dielectric fluid, the flow battery being housed in the main enclosure, immersed in the dielectric fluid;
   wherein at least one of the first electrolyte storage tank, the second electrolyte storage tank and the at least one electrolyte pressure compensator are outside the main enclosure.

2. The uninterruptible power supply unit of claim 1, wherein the at least one electrolyte pressure compensator further includes:
   a first electrolyte pressure compensator, connected to the first electrolyte storage tank, to provide pressure balancing between an ambient medium surrounding the first electrolyte pressure compensator and the first electrolyte inside the first electrolyte storage tank, and
   a second electrolyte pressure compensator, connected to the second electrolyte storage tank, to provide pressure balancing between an ambient medium surrounding the second electrolyte pressure compensator and the second electrolyte inside the second electrolyte storage tank.

3. The uninterruptible power supply unit of claim 1, further comprising:
   a dielectric fluid pressure compensator to provide pressure balancing between an ambient medium surrounding the main enclosure and the dielectric fluid inside the main enclosure.

4. The uninterruptible power supply unit of claim 1, wherein the main enclosure further houses:
   at least one of the first electrolyte storage tank and the second electrolyte storage tank, and
   at least one electrolyte storage tank to provide pressure balancing between the dielectric fluid inside the main enclosure and electrolytes inside the electrolyte storage tank, housed in the main enclosure.

5. The uninterruptible power supply unit of claim 1, further comprising:
   at least one electrolyte pump to pump one of the first electrolyte and the second electrolyte, from a respective one of the first electrolyte storage tank and the second electrolyte storage tank, to a respective negative electrode cell or positive electrode cell.

6. The uninterruptible power supply unit of claim 5, wherein the at least one electrolyte pump further includes:
a first electrolyte pump to pump the first electrolyte from the first electrolyte storage tank to the negative electrode cell, and
a second electrolyte pump to pump the second electrolyte from the second electrolyte storage tank to the positive electrode cell.

7. The uninterruptible power supply unit of claim 5, further comprising:
at least one electrolyte valve, interposed between one of the first electrolyte storage tank and second electrolyte storage tank and a respective one of the negative electrode cell and the positive electrode cell.

8. The uninterruptible power supply unit of claim 7, further comprising:
an electrical power converter, electrically connected to the at least one flow battery module and electrically connectable to an external load to be powered by the uninterruptible power supply unit.

9. The uninterruptible power supply unit of claim 8, wherein the at least one flow battery module includes a plurality of flow battery modules and wherein one or more electrical switches are provided between the plurality of flow battery modules and the electrical power converter.

10. The uninterruptible power supply unit of claim 8, further comprising:
a control system module to control the at least one electrolyte pump and the electrical power converter.

11. The uninterruptible power supply unit of claim 10, wherein the main enclosure further houses at least one of:
the at least one electrolyte pump,
the at least one electrolyte valve,
the electrical power converter, and
the control system module.

12. The uninterruptible power supply unit of claim 1, wherein the at least one flow battery module includes a plurality of negative electrode cells and a plurality of positive electrode cells, arranged in series.

13. The uninterruptible power supply unit of claim 1, wherein the at least one flow battery module includes a plurality of flow battery modules, each of the plurality of flow battery modules being connected to the first electrolyte storage tank and being connected to the second electrolyte storage tank.

14. The uninterruptible power supply unit of claim 1, wherein at least one of the first electrolyte and the second electrolyte is Vanadium-based.

15. The uninterruptible power supply unit of claim 2, further comprising:
a dielectric fluid pressure compensator to provide pressure balancing between an ambient medium surrounding the main enclosure and the dielectric fluid inside the main enclosure.

16. The uninterruptible power supply unit of claim 15, wherein the main enclosure further houses:
at least one of the first electrolyte storage tank and the second electrolyte storage tank, and
at least one electrolyte storage tank to provide pressure balancing between the dielectric fluid inside the main enclosure and electrolytes inside the electrolyte storage tank, housed in the main enclosure.

17. The uninterruptible power supply unit of claim 4, further comprising:
at least an electrolyte pump to pump one of the first electrolyte and the second electrolyte, from a respective one of the first electrolyte storage tank and the second electrolyte storage tank, to a respective negative electrode cell or positive electrode cell.

18. The uninterruptible power supply unit of claim 17, wherein the at least an electrolyte pump further includes:
a first electrolyte pump to pump the first electrolyte from the first electrolyte storage tank to the negative electrode cell, and
a second electrolyte pump to pump the second electrolyte from the second electrolyte storage tank to the positive electrode cell.

19. The uninterruptible power supply unit of claim 17, further comprising:
at least an electrolyte valve, interposed between one of the first electrolyte storage tank and second electrolyte storage tank and a respective one of the negative electrode cell and the positive electrode cell.

20. The uninterruptible power supply unit of claim 3, further comprising:
an electrical power converter, electrically connected to the at least one flow battery module and electrically connectable to an external load to be powered by the uninterruptible power supply unit.

21. The uninterruptible power supply unit of claim 5, further comprising:
an electrical power converter, electrically connected to the at least one flow battery module and electrically connectable to an external load to be powered by the uninterruptible power supply unit.

22. The uninterruptible power supply unit of claim 2, wherein the first electrolyte pressure compensator, the first electrolyte storage tank, the second electrolyte pressure compensator and the second electrolyte storage tank are outside the main enclosure.

23. The uninterruptible power supply unit of claim 2, wherein the at least one flow battery module includes a plurality of flow battery modules, each of the plurality of flow battery modules being connected to the first electrolyte storage tank and being connected to the second electrolyte storage tank.

24. The uninterruptible power supply unit of claim 2, wherein at least one of the first electrolyte and the second electrolyte is Vanadium-based.

\* \* \* \* \*